Patented Oct. 27, 1953

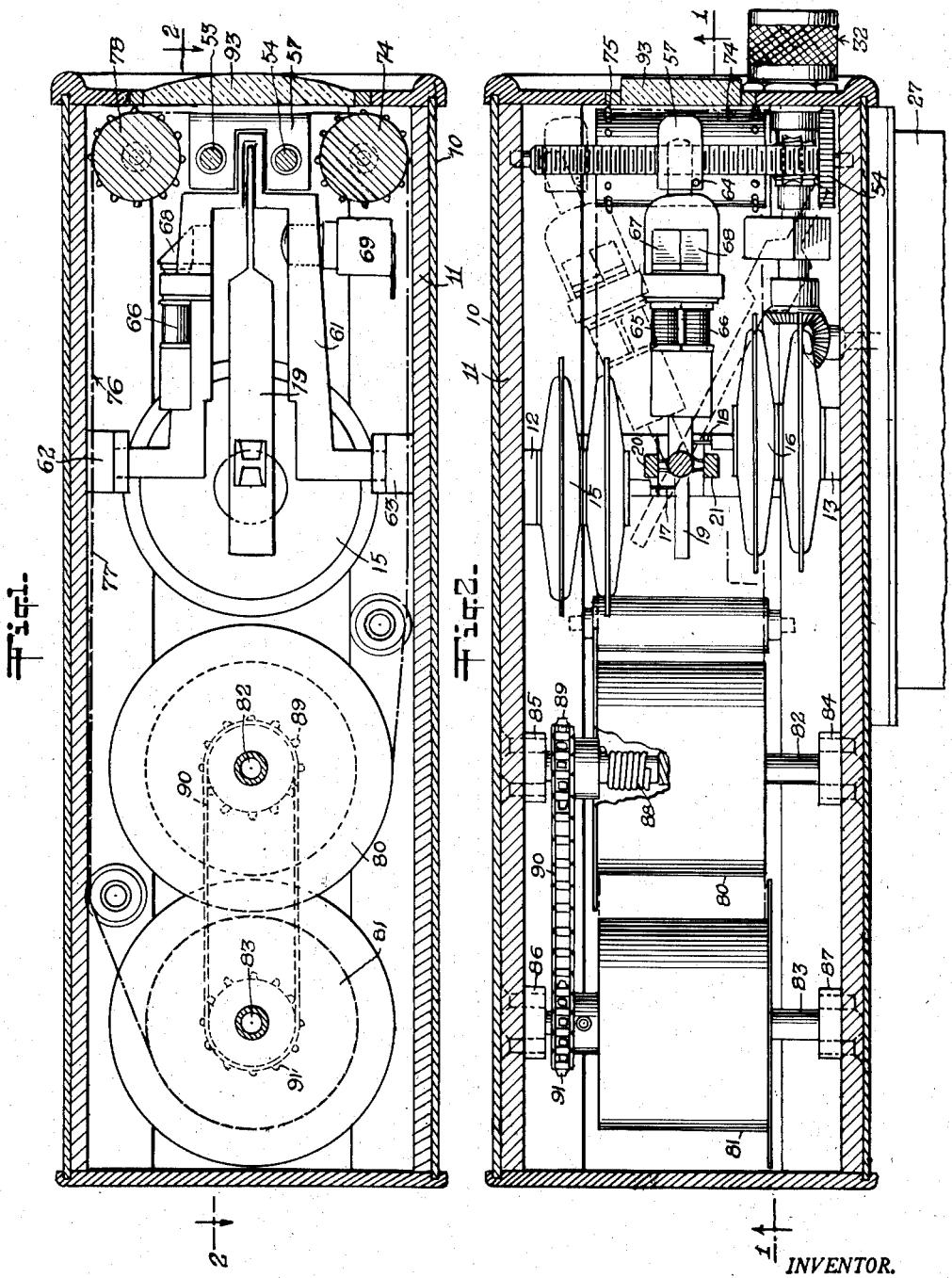

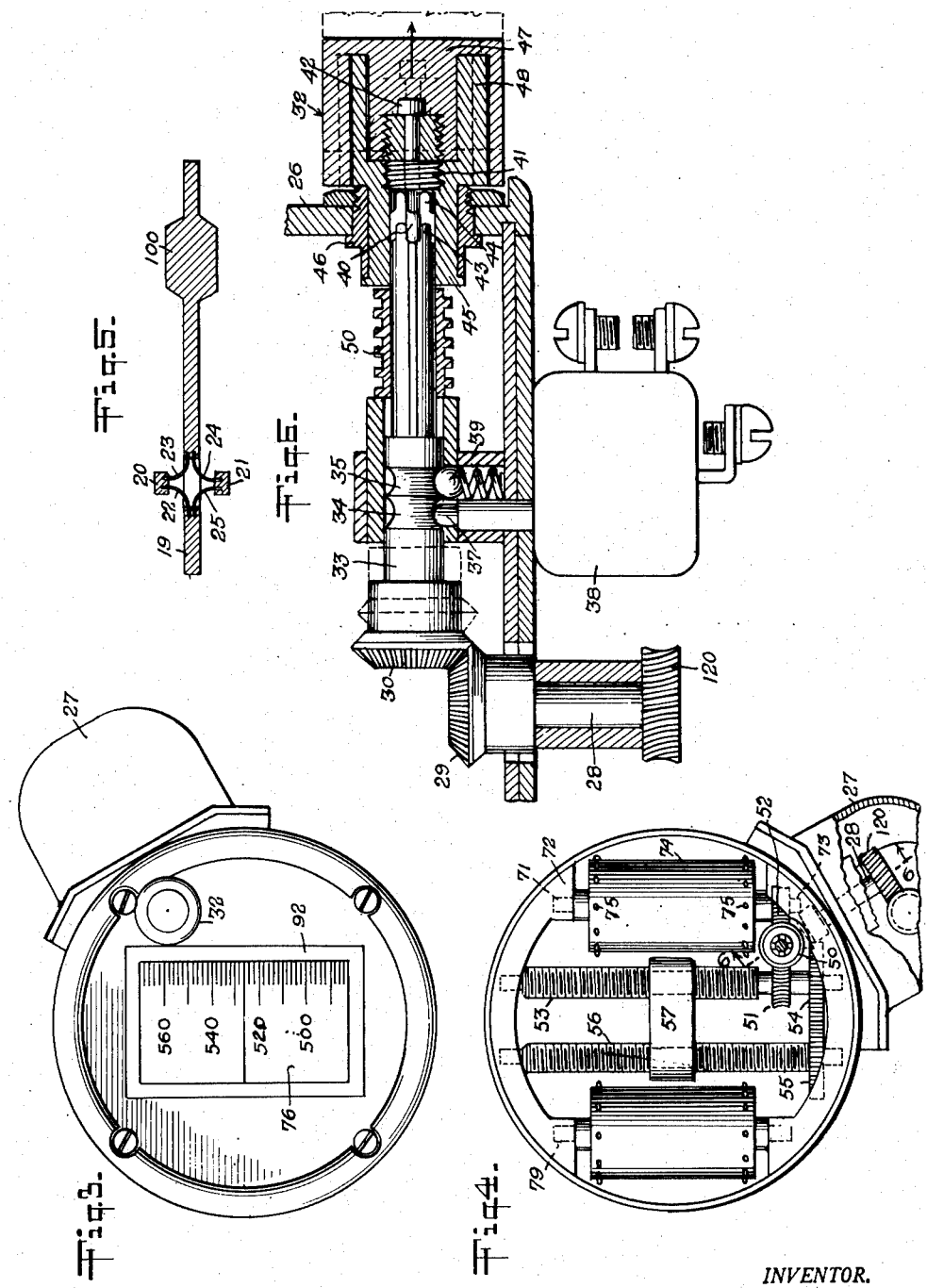

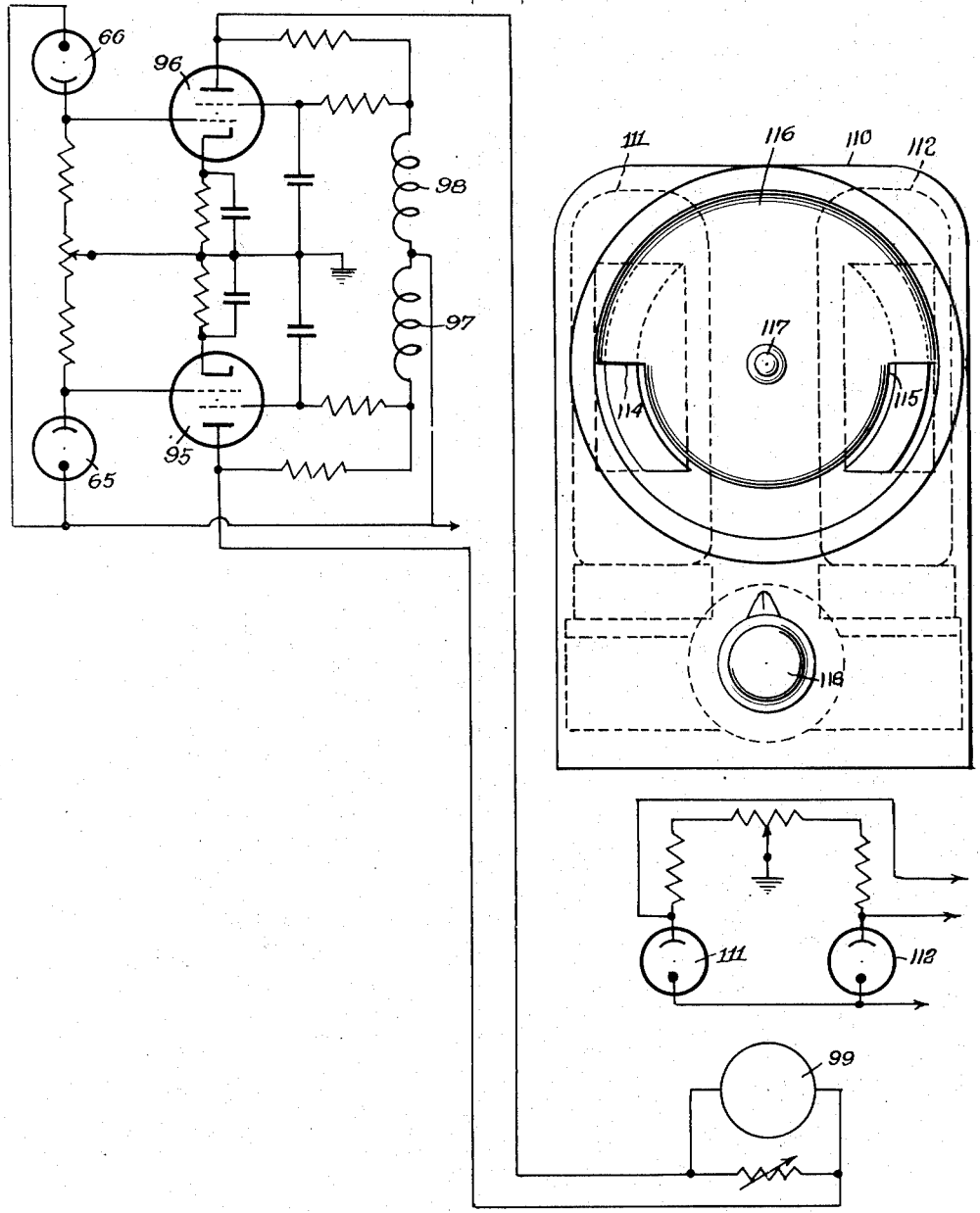

2,656,721

UNITED STATES PATENT OFFICE 2,656,721

PRESSURE RESPONSIVE PHOTOELECTRIC INDICATING, MEASURING, AND CONTROL DEVICE

Frederick C. Melchior, New York, N. Y., assignor of one-half to Effie B. Melchior, New York, N. Y.

Application August 26, 1947, Serial No. 770,744

6 Claims. (Cl. 73—389)

This invention relates to instruments or apparatus for indicating, and measuring forces and quantities, and related physical factors, and for controlling other instruments and operating devices according to such stimuli. More particularly, it relates to such apparatus where infinite sensitivity and optimum accuracy are required in order to indicate accurately any infinitesimal change in said stimuli.

The invention also relates to instruments in which the actuating element may be of the pressure sensitive variety, such as altimeters, or of the electrical, mechanical or thermal variety, where optimum accuracy and infinite sensitivity over the entire operating range are most important.

An object of the invention is to provide for infinite sensitivity through completely effortless operation of the indicating mechanism on the part of the actuating element in addition to elimination of all friction in the mechanism transmitting the motion of the actuating elements.

Another object of the invention is to provide for optimum accuracy by establishing a mathematical point of relative positioning of the transmitting device and the indicating mechanism, for which the entire scale of the instrument may be calibrated.

A further object of the invention is to provide means for generating a differential impulse proportional to departure in either direction from the aforesaid mathematical point of relative positioning between the transmitting device and the indicating or registering mechanism.

A still further object of the invention is to provide means for amplifying the aforesaid differential for use in operating a servo-mechanism, either by way of relay for precise indications of values measured, or directly from the amplifying means for control of such values.

It is also an object of this invention, through simple and compact design, to incorporate the foregoing desiderata in one unit within the ramifications of bulk and weight commensurate with normal instrument practice in the various fields, thus allowing any instrument to be used at will, as an indicating, recording or controlling instrument.

Additional objects as well as the exact nature and scope of the invention will be understood from the accompanying drawings illustrating the various details of the apparatus for carrying the invention into effect, and from the following specifications.

Referring now to the drawings:

Fig. 1 is a longitudinal cross-sectional view of a typical instrument designed in accordance with the present invention taken on the line 1—1 of Fig. 2.

Fig. 2 is a longitudinal cross-section taken approximately on the line 2—2 of Fig. 1.

Fig. 3 is a front view of the subject instrument.

Fig. 4 is a top view thereof with the face plate and scale removed.

Fig. 5 is a detailed view in section of the transmitting lever.

Fig. 6 is an enlarged detailed view taken on the line 6—6 of Fig. 4 of the knob mechanism.

Fig. 7 is a diagram of the photo-cell servo circuit.

As may be seen from the drawing, the device chosen to illustrate the invention is in an instrument of the pressure sensitivity type in which capsules responding to pressure changes comprise the actuating element. It is to be noted that the exact nature and design of the subject device will in no way affect the scope and usefulness of my invention which can be used in connection with many types of measuring, indicating and governing instruments where accuracy, sensitivity and readability are of paramount importance. Such devices may refer to highly diversified applications such as thermal instruments for recordings, thermostatic and combustion control, electrical instruments for measuring and governing over a wide range and with optimum accuracy a number of factors such as voltage, amperage, magnetic and induction forces, mechanical measurements and recordings for weight balances, precision scales, etc. The illustration as here presented is therefore only to be construed as an example of what I consider a simple and logical application of the basic principle of the invention.

Referring now to Figures 1 and 2, it will be seen that the instrument here illustrated is housed in a conventional case 10 that may well be used for installation in various types of instrument panels. Within the casing 10 is a rigid framework 11 which supports the mechanism hereinafter described. Affixed to the framework 11 by anchor plates 12 and 13 are two sets of pressure sensitive capsules 15 and 16 mounted in such a manner as to substantially oppose each other. Each set may be composed of one or more capsules joined together by any suitable means such as welding or soldering. The same or other means may be used to anchor them to the framework 11. The number of capsules to be used and the size thereof will be determined largely by the space available as well as the range of motion and the power desired for the operation of the transmitting mechanism. These capsules provide the force or motive power by which the structure is actuated. The instrument is set by other means which will be hereinafter described.

The stems of the inner-most capsules are provided with spring strips 17 and 18 which are adapted to actuate the lever mechanism hereinafter described. These strips 17 and 18 are preferably made of spring metal. The flexibility or resiliency of these strips is such that the force applied by the capsules through the strips upon the lever mechanism is inadequate and insufficient to pull or collapse the strips. In other words, the strips are sufficiently rigid to enable them to follow the movements of the lever mechanism hereinafter described.

The free ends of the spring members 17 and 18 are connected to a longitudinally disposed lever 19 suspended by means of a flexure system on brackets 20 and 21. It will be noted, particularly in Figure 5, that the flexure system consists of four identical flexures 22, 23, 24 and 25 so arranged that any pivotal movement of the lever 19 will cause rates of deflection which are symmetrical about any axis through the pivotal point of the lever 19. Thus the end of said lever 19, or any point thereon, will always describe a true circle. This is important, as otherwise, the lever may not in all positions conform with the exact point of positioning relative to the indicating device as is required for accuracy of calibration. The strips 17 and 18 connect with the lever 19 at points respectively above and below the theoretical pivotal point of the lever 19. Therefore, when the capsules expand, such as would be the case under decreased pressure, such forward motion on the part of the strips 17 and 18 will cause the lever 19 to pivot in one direction. It will be seen that the pressure sensitive mechanism consisting of two sets of capsules, spring strips and transmitting lever suspended by the unique flexure system constitutes an exceedingly simple structure.

Referring now to the indicating mechanism and more particularly to Figure 2 and Figure 6, there is mounted at the front end 26 of the casing 10 a knob 32 which is the means whereby the instrument may be set for a given value and an indicating mechanism operated accordingly. Mounted on the side of the casing 10 is a servo-motor 27 having a shaft 28 extending through the casing 10 and carrying a bevel gear 29 which gear 29 is adapted to engage a similar bevel gear 30 mounted on the shaft 33. When the gears 29 and 30 are engaged the knob 32 is inoperative and the device is firmly connected to the servo-motor. When it is desired to operate the instrument manually the gears 29 and 30 may be disengaged by pulling out the knob 32 a small fraction of an inch. This also opens the switch 38 to make the servo-motor inoperative. It will be noted that the shaft 33 has two grooves 34 and 35. As shown in Figure 6 the switch button 37 controlling the switch 38 rides in the groove 34 while a spring loaded ball 39 rides in the groove 35. When the knob is pulled out the entire shaft 33 is moved longitudinally and the switch button 37 rides upwardly out of the groove 34 onto the shaft to open the switch. The ball 39 then rides in the groove 34. The shaft 33 has an extending rod 40 which passes through the screw plug 41 and while free to rotate therein is held in place by a nut 42. Teeth 43 are provided on the end of the shaft 33 and are adapted to engage corresponding teeth 44 mounted on the threaded member 41. Since the instrument may be used in a pressurized cabin it may be necessary to have it air-tight. The knob is, therefore, made in several portions including a section 45 mounted within the bushing 46 and the outer portion 47 which is provided with an internal groove adapted to receive the extension 48 of the member 45. When the knob 32 is pulled outwardly it carries with it the rod 40, thus moving the shaft 33 longitudinally to engage the teeth 43 and 44 and disengage the gears 29 and 30 at the same time operating the switch button 37.

Mounted on the shaft 33 splined thereto is a worm 50 which engages two worm gears 51 and 52. The worm gear 51 is fixedly mounted on a transversely extended shaft 53 equipped with a rigidly mounted pinion 54 which in turn is engaged to an identical pinion 55 rigidly mounted on another transverse shaft 56 which is similar and parallel to the shaft 53. The shafts 53 and 56 are finely threaded with opposite threads which engage a double nut 57 bored and threaded through both ends to match the shafts 53 and 56.

From the foregoing it is obvious that when the knob 32 is in the outward position and is turned the worm 50 will cause the worm gears 51 and 52 to rotate in opposite directions. By the same token the rotation of the worm 51 will be directly transmitted by the pinion 54 to the pinion 55 thus causing the shafts 53 and 56 to rotate in opposite directions. As the threads on the shafts as well as in the nut 57 are also opposed, it is evident that the said nut 57 will be caused to travel in one direction or another parallel with the longitudinal axis of the shafts 53 and 56.

Referring now to Figure 1 we find a pivoted member or carriage 61 suspended in bearing bosses 62 and 63 which in turn are fixedly attached to the framework 11. The extreme upper part of the carriage 61 extends up into and between the two ends of the double nut 57 resting against a lug or dowel pin 64 in nut 57 on each side thereof, thus preventing the carriage from bypassing the nut 57. As the carriage 61 is also spring loaded (any conventional spring may be used) against the aforesaid pin 64, it follows that for any given position of the nut 57, the carriage 61 will maintain a precise corresponding position and will also inevitably follow the nut in its motion over its entire range of travel.

Fig. 1 and Fig. 2 indicate two photo-electric cells 65 and 66, each with prisms 67 and 68 rigidly suspended on the carriage 61. In Fig. 1 there is also shown a light source 69 mounted in an aperture in the carriage 61 in such a manner as to dispose and direct its light substantially into the aforesaid prisms. To this end the light source may be equipped with optical means such as a split lens of suitable shape which will divide the light into two beams, one for each of the prisms, or the light may be diffused so as to substantially cover the area occupied by the prisms. These components constitute an integral part of the indicating mechanism and will always maintain their once determined relative positions. Individually they comprise units known to the art, in current use and should require no further explanation.

Referring now to Fig. 4 we find that the worm 50 engages in addition to the worm gear 51 another worm gear 52 while the latter worm gear is mounted transversely on the extended shaft 71 which rotates freely in bearings 72 and 73 carried by the frame 11. Fixedly mounted on the shaft 71 is a spool 74. It will be seen from the foregoing that when the knob 32 is turned by the operator the worm 50 will cause the worm gear 52 and hence the shaft 71 and spool 74 to rotate. It will be evident from the foregoing, therefore, that the worm 50 actuates two mechanisms. One is the mechanism by which the nut 57 is moved and the other is the mechanism by which the spool 74 is turned. Since the worm 50 actuates both mechanisms it will be understood that the rotary movement of the spool 74 will correspond to the linear movement of the nut 57. The spool 74 is provided with a plurality of regularly extended projections, or teeth, 75 which extend along two common circumferential lines. These projections 75 enable the spool 74 to act as a sprocket by which the indicating tape 76 having perforations 77 formed therein may be engaged and advanced in either direction, and when the sprocket spool 74 is turned, the corresponding movement of the tape 76 will be caused. That is, rotation of the sprocket spool in one direction will cause movement of the tape in the same direction, and rotation of the sprocket spool in the opposite direction will cause corresponding movement of the tape in the opposite direction.

Reference to Figures 1 and 2 will show that there are two spools altogether in the instrument under description. Adjacent sprocketed spool 74 is an idling spool 78 mounted on a shaft 79 in suitable bearings so that the shaft 79 is parallel to the shaft 71. These two spools are mounted at the front end of the instrument. At the back end of the instrument is a pair of reels 80 and 81, these latter reels being rotatably mounted on shafts 82 and 83 which are suspended in bosses 84, 85, 86, and 87 of the frame 11. The tape 76 is connected at one end to the reel 80 and at the other end to the reel 81 which extends from reel 80 around spool 74, thence around spool 78 and finally to reel 81. It will be understood from the foregoing that when the spool 74 is caused to rotate as above described the tape will be caused to unwind from one of the reels 80 or 81 and to reel on the other of said reels.

Fig. 2 shows that the reel 80 is provided with a coil spring 88. This spring is attached at one end to the reel 80 and at the other end to a sprocket 89 which turns freely on the shaft 82. Its function is to resist movement of either of these two reels relative to the other and this is accomplished by means of a chain 90 connecting the sprocket 89 with another sprocket 91 which is rigidly affixed to the reel 81. In consequence it causes the tape 76 to remain at a relatively taut position at all times.

It will be noted in Figures 1 and 3 that at the front end of the casing 10 is a window 92. This window is fitted with a magnifying lens 93 through which the tape may be viewed. The tape in the embodiment shown in the drawing is provided with calibration designated by the numbers 500, 520, 540 and 560 on the tape in Fig. 3. This calibration may be viewed through the window and through the lens. It will be noted that the tape may carry other calibration designated in a different manner, depending upon the purpose for which the instrument is intended to be used.

From the foregoing it will be understood that any position of the tape always corresponds to a given position of the nut 57 and the carriage 61. More specifically, any given reading will correspond to a predetermined position of the members 61 and 57. Thus, it is obvious that every inch of tape 76 can be calibrated to conform precisely with the motion of the actuating elements thereby avoiding discrepancies inherent in the multi-revolution instruments, where, on the clock principle, the large hand denotes, for example, a thousand feet of altitude for each revolution. Inasmuch as no capsules or bellows are accurately following a straight line or predetermined graph, it is obvious that such multi-revolution instruments are subject to considerable error, whereas, with the subject arrangement custom calibration will insure optimum accuracy over the entire operating range.

While the mechanical components of the transmitting and indicating mechanism have been fully described it is obvious that there must be provided a mechanism for registering and translating into action the relative motions of the transmitting and indicating mechanisms.

In Fig. 7 I show a diagram of a photo-electric circuit embodying known components which are connected in a novel and practical manner so as to effect the aforementioned objects of the invention in a simple and superior way. We note the photo-cells 65 and 66, the amplifier tubes 95 and 96, the relays 97 and 98 and the potentiometer of the variable resistance 99. In addition there is introduced a suitable number of condensers and resisters for the purpose of smoothing or levelling off excessive peak loads.

In Fig. 5 it will be seen that the lever 19 widens appreciably near its top end 100, which is the portion that passes between the light source and the photo-electric prisms. The width of this lever blade is determined so that it is somewhat less than the combined width of the two light beams entering said prisms. Thus, it may in one position, and in one position only, relative to the carriage 61, intercept an equal amount of light from each cell. This, then, is the aforementioned point of equilibrium where the cells are energized to an equal degree and for which the scale may be custom calibrated over its range corresponding with the range of motion of the nut 57 and the carriage 61. However, as it is practically impossible to maintain any stimuli at a precise constant value for an appreciable period of time, it is evident that even an infinitesimal change in such value will cause a slight movement of the lever 19 to one side or another and thus a departure from the aforementioned point of equilibrium. This, in turn, will create a differential between the two cells, adding more light to one and detracting from the other. Such differentials are amplified by the tubes 95 and 96 causing the relays 97 and 98 to open and close alternately according to the direction of the motion of the lever 19. These relays are of the ultrasensitive type requiring only minute changes in current to open and close, and, being balanced against one another to a point where the slightest differential will detract from one and add to the other, they cannot both remain open or closed at the same time but will alternate according to change in stimuli. As the aforesaid point of equilibrium is practically mathematical, it follows that the instantaneous action is synonymous with practically infinite sensitivity.

From the foregoing it is also evident that any departure of the lever 19 from the aforementioned point of equilibrium relative to the carriage 61 will cause a differential in the energizing of the cells 65 and 66 and, likewise, that said differential may be amplified to any desired degree and, when amplified, may be used to operate one or more servo mechanisms of accepted type, either directly through the pickup from the amplifier tubes 95 and 96 for proportional action, or by way of relays 97 and 98 for decisive or definite action. In some instances it may be desirable to obtain a combination of decisive and proportional action. In such case the amplified differential may be taken from the amplifier tubes 95 and 96 to a photo-electric relay such as is shown in Fig. 7. This photo-electric relay 110 consists of a milli-volt meter into which have been installed two photo-electric cells 111 and 112, the cathodes of which are exposed to a common light source 99 by way of the apertures 114 and 115. In place of the conventional pointer the milli-volt 110 meter has an opaque screen or a disc 116. Said disc or screen is very light and is perfectly balanced about its axis 117. In neutral position said disc obscures about one-half of each of the apertures 114 and 115, thus maintaining equilibrium between the cells 111 and 112. However, the moment the differential is generated in the cells 65 and 66 and amplified in the tubes 95 and 96, a differential in voltage entering the milli-volt meter will cause the disc 116 to rotate in one direction or another from its neutral position, according to the direction of departure between the lever 19 and the carriage 61, thus admitting more light to one and detracting from the other of the cells 111 and 112. As the milli-volt meter is a very sensitive instrument, it is readily seen that in this manner one may obtain any rate and degree of proportional and/or decisive action even for infinitesimal departures from the mathematical point of equilibrium between the lever 19 and the carriage 61. In addition, the action of the milli-volt meter may be speeded up or slowed down by the use of resisters and potentiometer 118, which, furthermore, may be employed to compensate for possible differences in photo-cells which may accrue over long periods of time. This versatility of action is very important as, even for any one application, varying conditions may require a different rate of re-action and governing.

In order to better clarify the operative functions of the invention I shall refer to two broad categories of duties basically: 1, as an indicating device; 2, as a controlling device. For use as indicating device the invention must incorporate a suitable servo mechanism for operation of the gear assembly which operates the carriage 61 with its photocells 65 and 66 and light source 69. Inasmuch as the carriage 61 is synchronized with the tape scale 76 in a manner hereinabove described it is inevitable that any position which the servo mechanism may cause the carriage 61 to assume will always be identified with the corresponding reading on the tape scale 76. In operation, when the shaft 33 is in the rearward position with the bevel gears 29 and 30 engaged and the teeth 43 and 44 disengaged, the motor 27 which is geared to the gear 120 in the conventional manner is energized by the closing of the switch 38 and operates through the gears 29 and 30 and the worm 50 engaging the gears 51 and 52. This, then, is the condition representing the invention as an indicating device. When due to change in degree or magnitude of stimuli, affecting the actuating elements 15 and 16, the lever 19 departs from or bypasses the mathematical point of equilibrium between the photo-cells 65 and 66, a differential is generated in the energizing of the cells, said differential being amplified by the tubes 95 and 96 and causing the relays 98 and 99 to alternately close and open according to the relative position of the lever 19 to that of the carriage 61, as it changes from one side to the other of the aforesaid mathematical point of equilibrium. As the relays govern the operation of the reversible motor 27, it is readily seen that in this manner the motor will operate the carriage 61 so as to always seek equilibrium between the photo-cells and the lever 19, thus also producing an indication of corresponding value on the tape scale 76 due to the lever being positioned with the carriage 61 as hereinabove described. In order to change the device into a governing or controlling instrument, it is only necessary to pull out the manual knob 32 until the teeth 43 and 44 engage solidly. It is to be noted that the motion required for such engagements equals the center to center distance between the grooves 34 and 35, and it is, therefore, evident that in the course of such motion the ridge between such grooves will be forced past the ball 39 and the ball will come to rest in the groove 34, holding the shaft firmly in position. It will also be seen that at the same time the switch pin or button 37 will be depressed to open the switch 38, thus causing the servo motor to be cut out. The instrument can now be set for any given desired value of stimuli by operating the manual knob 32 which in turn operates the carriage 61 and the tape scale 76 in the manner previously described. In the first instance, notably that of an indicating device, it was shown how the servomotor was made to operate the carriage 61 and thereby also the tape scale so as to seek equilibrium for the photocells with the lever 19. It has been explained how any departure from the aforesaid mathematical point of equilibrium, admitting more light into one photocell than into the other, would generate a differential between the energizing of the photocell 65 and that of the similar photocell 66, said differential being amplified to operate the relays which in turn govern the operation of the servomotor in a manner so as to always seek to bring the carriage 61 back to the point of equilibrium. When the invention is to be used as a governing or controlling device the desired value of stimuli is selected and the indicating mechanism is set for such a value by turning the manual knob 32 until the precise reading is obtained on the tape scale. Such reading must then also conform with a given position of the carriage 61. Whatever be the value of the stimuli affecting the actuating capsules 15 and 16 it should be noted that the position of the lever 19, whether or not it is intercepting any portion of the light beams to the photocells, will have determined which one of the relays 97 and 98 remain open and which remain closed, depending upon which light beam was the last to be intercepted. In a manner as previously described said relays will now govern another servomotor which likewise will serve to obtain equilibrium between the lever 19 and the carriage 16. However, in this case, as the carriage is set for a given value the object of the other servomotor will be to adjust the value of the stimuli so as to bring the lever 19 into a position of equilibrium with the photocells 65 and 66 on the carriage 61. Such stimuli may, for example, be in the nature of pressure in a laboratory test tank, in which case the relays would operate a motor driving a compressor, and a relief valve as well. However, regardless of the nature of the stimuli, the operation of the photocell circuit in conformance with the relation between the lever 19 and the carriage 61 remains the same irrespective of whether it makes the carriage 61 seek equilibrium with the lever 19 as positioned by a given value of stimuli, or whether it makes the lever 19 seek equilibrium with the carriage 61 by governing such stimuli by way of some outside power source.

It will be understood that in most instances the relays 98 and 97 will be sufficient to govern the control of a servomotor or other power source where decisive or definite action is required. Where proportional action or a combination of decisive and proportional action is required, the second stage relay 110 will be used in a manner as clearly indicated in Fig. 7.

Referring now to the objects of the invention, it may be well to review some of its more salient, basic features so as to confirm the manner and measure in which said objects have been fulfilled.

As is clearly shown in Fig. 5, the transmitting lever 19 is suspended on spring flexures and connected to the actuating elements by similar means, embodying no friction such as is inevitably encountered with pivots or shafts suspended in bearings; likewise, the interception of light beams by the lever 19 involves no friction or effort whatsoever, and it is therefore evident that any reaction or impulse on the part of the actuating elements is transmitted with infinite sensitivity to the indicating mechanism.

It is also a well known fact that photo-electric cells are extremely sensitive, say, to one millionth of an inch, and the aforesaid point of equilibrium, established by the lever 19 intercepting an equal amount of light from each of the cells 65 and 66, may therefore be considered as mathematical. Thus, optimum accuracy depends only upon the actuating elements and is obtainable insofar as the art of craftsmanship is capable.

Differential in the energizing of the twin-photocells is an inevitable and immediate consequence of any departure from the aforesaid point of equilibrium, and the amplification of such differential is accomplished by means known to the art. The use of a photo-cell relay, such as shown in Fig. 7, comprising in effect a second stage, further enhances the versatility of the invention and vastly augments the sensitivity and flexibility of its servo mechanism.

As may be seen from the drawings, there is illustrated an instrument of standard aircraft size, embodying all of the elements of both an indicating and controlling instrument, with the exception of the amplifying means which may be considered as control accessories. From the description it is also obvious that the invention permits of instant change of function from that of an indicating to that of a controlling device by the mere push or pull on the manual knob 32.

Hereinbefore I have duly described the novel and operative structure of my invention. In order to also underscore its usefulness, it may be well to make brief reference to some of the various applications where it will perform its functions in a superior manner. Inasmuch as I have chosen to illustrate it in the role of a logical aircraft instrument, it may be in order to first stress its utility in this particular field.

(A) As a self-indicating altimeter, with a photo-cell operated servo unit, it will always read true pressure altitude with instant accuracy, covering a range of 80,000 feet or over.

(B) As an altitude governor, in conventional aircraft operation, it will maintain constant preselected cruising altitude by governing the servo of the automatic pilot. This also applies to the circling of airports preparatory to let-down for landing.

(C) As a landing altimeter, set for a preselected absolute pressure altitude in the final approach for landing, it will signal the proper height (above the runway) for reducing the rate of descent; or, it will automatically accomplish this through direct servo action without interference on the part of the pilot.

(D) As an altimeter setting instrument, in the airport control towers, with its photo-cell servo operating a band of selective frequencies as well as its tape scale, it will automatically and continuously set and zero the altimeters of incoming aircraft having the same type of equipment.

(E) As an altitude control unit, in guided missiles and pilotless aircraft, it will maintain a given pre-selected altitude; or, connected to a suitable timing unit, it will maintain a series of progressive altitudes according to a prescribed pattern. In the latter case it would become part of an installation for automatic navigation and controlled flight paths.

(F) The above altitude control, for use in guided missiles and pilotless aircraft, may be modified to incorporate also a capacitance or sensing element for governing of fuel injection according to altitude and air density.

(G) Referring back to paragraphs C and D, we are looking forward to automatic landings in a reasonably near future. In my opinion, this new instrument will comprise an important component in the equipment required therefor.

Considering now the marine field, we find the invention almost equally useful. While the potential applications undoubtedly are very numerous, a few of the more important ones will suffice for the sake of illustration.

As a marine speedometer and speed governor in naval vessels—utilizing the present pilot tube for obtaining dynamic pressure of the water on the same principle as that which applies to the airspeed indicator in the aircraft—an instrument designed in accordance with the invention may be calibrated to accurately indicate the speed through the water to within one-tenth of a knot, or even one-hundredth of a knot if desired. At the same time, by a mere pull on the manual knob, it may be instantly set to control the speed of the vessel to within the aforesaid margin of any desired value—its photo-cell servo mechanism operating the turbine governors so as to obtain for the actuating elements the exact value of stimuli $$\text{dynamic pressure of the water: } \frac{m \times V^2}{2}$$

from the desired speed for which the indicating mechanism has been set.

Another application as a pressure sensitive instrument would be that of a depth indicating and control device. Operating in a manner as hereinbefore described, it would indicate in a submarine the exact depth below the surface. Likewise, it may instantly be set to control the depth of a submarine or an underwater missile to within a few inches.

As a differential pressure instrument it may be adapted for use as an air/fuel indicator, combination combustion control device, for boiler furnaces and for gas turbines alike. In this case the actuating elements operate on the pressure drop caused by the flow of air and fuel past a venturi.

There is also the logical possibility of adapting the invention for use as an automatic direction finder, with fully automatic and accurate control of the course when desired.

In the industrial field, including that of laboratory and test equipment, the applications are so numerous and diverse that it would be futile to here attempt to cover even a small fraction of them. Suffice it to say that, in all instances, the principle of operation remains the same—irrespective of whether the instrument indicates and/or controls pressure, temperature, speed, R. P. M., voltage, amperage, weights or other quantities involved. Its usefulness prevails wherever performance requirements call for the optimum in accuracy, sensitivity and readability.

I claim:

1. An indicating device of the type described, having a frame, opposing pressure responsive actuating elements mounted in said frame, a pivotal carriage secured to the sides of said frame, said carriage having photo-electric cells mounted on one side thereof and a source of light on the opposite side thereof, a lever disposed between said cells and light source, said lever being pivotally suspended by flexure means, means operatively connecting said operating elements to said lever, said means comprising flexible spring strips having one end attached to said elements and the opposite end to said lever, one of said strips being attached to said lever above its pivotal point and the other of said strips being attached to said lever below its pivotal point, whereby movement of said lever causes an unbalance in said photo-electric cells, means to indicate said unbalance and means for transmitting electrical energy in proportion to said unbalance.

2. In an instrument of the character described a pair of photo-electric cells, a light source for said cells, a member pivotally mounted to pass between said light source and said cells to cause an unbalance between said cells, said member being narrower than the combined overall breadth of said cells and covering the area between their centers, to cause a proportional unbalance between said cells and means to transmit said unbalance electrically, said cells having equal portions exposed to light from said light source when said member is in its zero position.

3. An apparatus for pivotally supporting a lever, including four flexure strips and two support members, said support members being positioned on the opposite sides of said lever, said strips being arcuately mounted with one end in each of said strips being secured to said lever, two of said strips being connected to said lever from opposite sides at a position below the pivotal point of said lever.

4. A light sensitive relay including a milli-volt meter, a source of light and two photo-electric cells, said light source being directed at said cells, a rotatable partially opaque disc mounted on the shaft of said milli-volt meter and positioned between said light source and said cells, the remainder of said disc being non-opaque, said disc in its normal position obscuring with its opaque portion a portion of each cell, said cells also having equal portions exposed to light from said light sources through the non-opaque remainder of said disk in its normal position, the illuminated and obscured portions of said cells being arranged so that the rotation of said disk will increase the obscured portion of said cell and decrease the obscured portion of the other cell, means to rotate said disc causing an unbalance in the electrical energy developed by said cells and said unbalance being utilized to selectively operate a servo-motor.

5. An indicating and control device of the type described, including a frame and a pivotal carriage mounted therein, gear means operatively connected to a drum mechanism and two spaced parallel shafts, a nut mounted on said shafts, the upper portion of said carriage positioned between said shafts and operatively connected to said nut, a calibrated tape mounted on said drum mechanism and means causing said gear means to operate whereby said tape will conform with the position taken by said carriage.

6. An indicating and control device of the type described including a frame and a pivotal carriage mounted therein, gear means operatively connected to a drum mechanism and two spaced parallel shafts, a nut mounted on said shafts, the upper portion of said carriage positioned between said shafts and operatively connected to said nut, actuating means controlling the pivotal movement of said carriage, a calibrated tape mounted on said drum mechanism and means causing said gear means to operate whereby said tape will conform with the position taken by said carriage due to operation of said actuating means.

FREDERICK C. MELCHIOR.

References Cited in the file of this patent

UNITED STATES PATENTS

| Number | Name | Date |
|---|---|---|
| 1,585,210 | Roux | May 18, 1926 |
| 1,690,455 | Paulin | Nov. 6, 1928 |
| 1,761,489 | Paulin | June 3, 1930 |
| 1,822,075 | Aronoff | Sept. 8, 1931 |
| 1,873,579 | Haas | Aug. 23, 1932 |
| 1,914,082 | Dennis | June 13, 1933 |
| 1,929,400 | Schulte | Oct. 3, 1933 |
| 1,930,496 | Wilson et al. | Oct. 17, 1933 |
| 2,067,741 | Weckerly | Jan. 12, 1937 |
| 2,113,436 | Williams | Apr. 5, 1938 |
| 2,208,284 | Weckerly | July 16, 1940 |
| 2,236,255 | Young | Mar. 25, 1941 |
| 2,265,149 | Crane et al. | Dec. 9, 1941 |
| 2,351,081 | Swift | June 13, 1944 |
| 2,376,459 | Stevens | May 22, 1945 |
| 2,410,502 | Hurley | Nov. 5, 1946 |
| 2,503,091 | Brooke, Jr., et al. | Apr. 4, 1950 |
| 2,530,068 | McCabe | Nov. 14, 1950 |

OTHER REFERENCES

Lange, Photoelements, Reinhold Publishing Corp., New York, copyright 1938, pages 252 and 253.